April 10, 1962 J. P. FAY ETAL 3,029,318

HEAD ADJUSTING MEANS FOR SIGNAL RECORDING OR REPRODUCING APPARATUS

Filed March 14, 1958 2 Sheets-Sheet 1

INVENTORS
James P. Fay
James K. Pickard
BY
Johnson and Kline
ATTORNEYS

INVENTORS
James P. Fay
James K. Pickard
BY
Johnson and Kline
ATTORNEYS

United States Patent Office 3,029,318
Patented Apr. 10, 1962

3,029,318
HEAD ADJUSTING MEANS FOR SIGNAL RECORDING OR REPRODUCING APPARATUS

James P. Fay, Norwalk, Conn., and James K. Pickard, Chevy Chase, Md., assignors to The Teletrak Corporation, Wilmington, Del., a corporation of Delaware
Filed Mar. 14, 1958, Ser. No. 721,531
10 Claims. (Cl. 179—100.2)

This invention relates to a device for reproducing signals from a recorded track on a recording tape. More specifically, it pertains to means for establishing a predetermined relationship between a scanning gap of a playback or signal reproducing head and the recorded signal on a tape.

In reproducing recorded signals of this type difficulty has been encountered in obtaining a maximum signal strength from the recorded signal, because of the fact that the scanning gap, in the playback head, is not parallel with or in the same predetermined relation with the recorded path as the gap in the head, which recorded the signal. This is a difficult problem when the tape is played by a head other than the recording head and particularly when the tape is used in another, but similar machine where the record head is not available as a reference.

The present invention overcomes this difficulty by providing a means for mounting the playback head whereby the rotative position of the head, and the scanning gap therein, can be adjusted so as to effectively line up with the signal in the recorded path, to pick up a maximum signal from the tape. This is accomplished by providing remotely controlled means for rotating the head on its mounting means. While this may be accomplished in many ways, as herein illustrated, it is accomplished by providing a heat-responsive actuator and by controlling the heater, supplying heat thereto, to rotate the head in either direction to effect the aligning operation.

It is, therefore, an object of this invention to provide a playback or reproducing head which is readily adjustable in its supporting means for establishing a predetermined relationship between the scanning gap in the head and the recorded signal on the tape, thereby facilitating the correction of mounting and skew errors.

It is also an object of the invention to provide a playback head which may readily be rotated within its mount for establishing a predetermined relationship between the scanning gap in the head and the previously recorded tape.

It is another object of the invention to provide means for making extremely accurate controlled adjustments of the head with respect to its carrier, preferably from a remote point for establishing a delicate predetermined relationship between the scanning gap in the head and the recorded signal on the tape.

It is further an object of the invention to provide means for mounting a playback head in a rotating carrier, for rotation therewith, which may be rotated transversely to the axis of rotation of the carrier, for establishing a predetermined relationship between the scanning gap in the head and a previously recorded signal on the tape.

With these and other objects in mind, reference is had to the attached sheets of drawings, illustrating one form of the invention, wherein like characters represent like parts, and in which.

Figure 1:
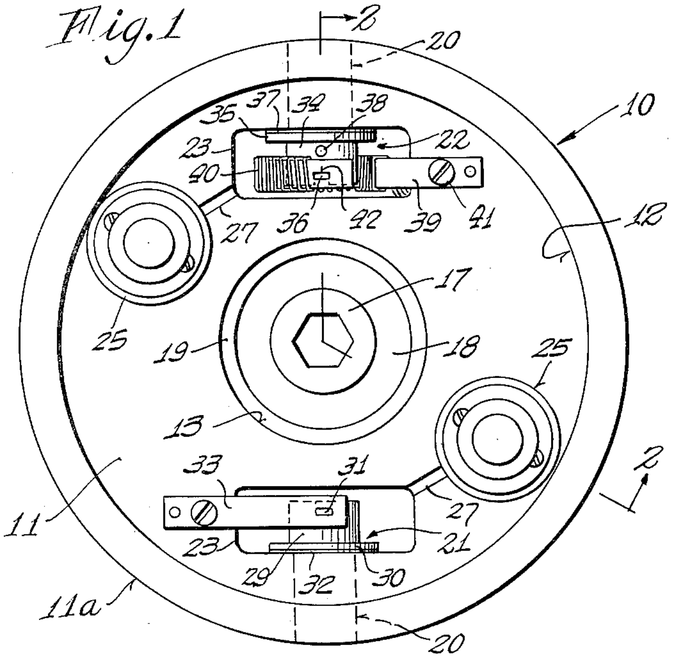
FIGURE 1 is an end view of a rotatable tape carrying drum showing an adjustable playback head mounted therein.
Figure 3:
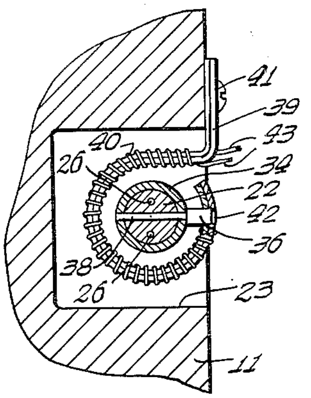
FIG. 3 is a fragmentary sectional view taken in the direction of the arrows 3—3, in FIG. 2.

While the device of the present invention may be employed with any playback head having a scanning gap for cooperating with a recorded track of predetermined width, it is herein illustrated in connection with a recording and reproducing device of the type shown in the Fay application Serial No. 699,958, filed December 2, 1957, having a rotating tape carrying drum which is generally indicated by the numeral 10. The drum, which preferably includes a cylindrical body 11 adapted to carry a recording tape around its outer surface 11*a*, is formed with an enlarged axial bore 12 and a bore 13 of reduced diameter, in axial alignment therewith. A core 14, which is mounted in bore 13 and provides a tapered bore 15 is adapted to frictionally seat a spindle 16. The spindle, which functions to rotate the drum, is retained against axial displacement with respect to body 11 by a drum lock screw 17, which engages the spindle and abuts washer 18. Washer 18 is seated in bore 13 abutting the inner end of core 14. A drum unlock ring 19, for purposes commonly known to the art, is mounted in body 11, adjacent the inner end of core 14 to encircle drum lock screw 17.

Extending inwardly from the outer surface 11*a*, of drum body 11, and removably seated in a bore 20, which is formed transverse to the axis of body 11, is at least one signal recording or reproducing head. In the illustrated embodiment of the invention, a pair of bores 20 are provided on opposed sides of the body, one adapted to seat a recording head 21 and the other a reproducing or playback head 22. Chambers 23 are formed in body 11, opening into bores 20 and enlarged bore 12, these chambers being adapted to house the mounts and lead wires of their respective heads and to facilitate manipulation of the parts. Also formed in drum body 11 are chambers 24, which may conveniently extend parallel the axis of the drum and are adapted to house transistor amplifiers 25 or any similarly functioning amplifier known to the art. The amplifiers, which are connected to their heads, 21 or 22, through lead wires 26, which extend through slots 27, between chambers 23 and 24, are connected through slip ring assembly 28, or similar means, to the recording or reproducing apparatus.

While the recording and reproducing means may employ various known recording media, in the illustrated form of the invention, magnetic heads having a predetermined scanning gap therein are provided for cooperating with a tape having a magnetic record-receiving surface thereon. As shown, the recording head 21, is provided with a mounting collar 29, formed with a flange 30 and an outstanding tongue 31. The flange, which is spaced from the outer wall of chamber 23 by head spacer 32, is adapted to retain the recording head against axial displacement outwardly of bore 20 while the head spacer functions to properly position the outer end of the head relative surface 11*a* of the drum. Tongue 31 is adapted to engage a slot formed in recording head clamp 33, which is secured to drum body 11, thereby fixing the position of the recording head and the gap therein with respect to the drum.

Figure 7:
FIG. 7 is a schematic illustration of one means for controlling the means for flexing the bimetallic element.
Figure 2:
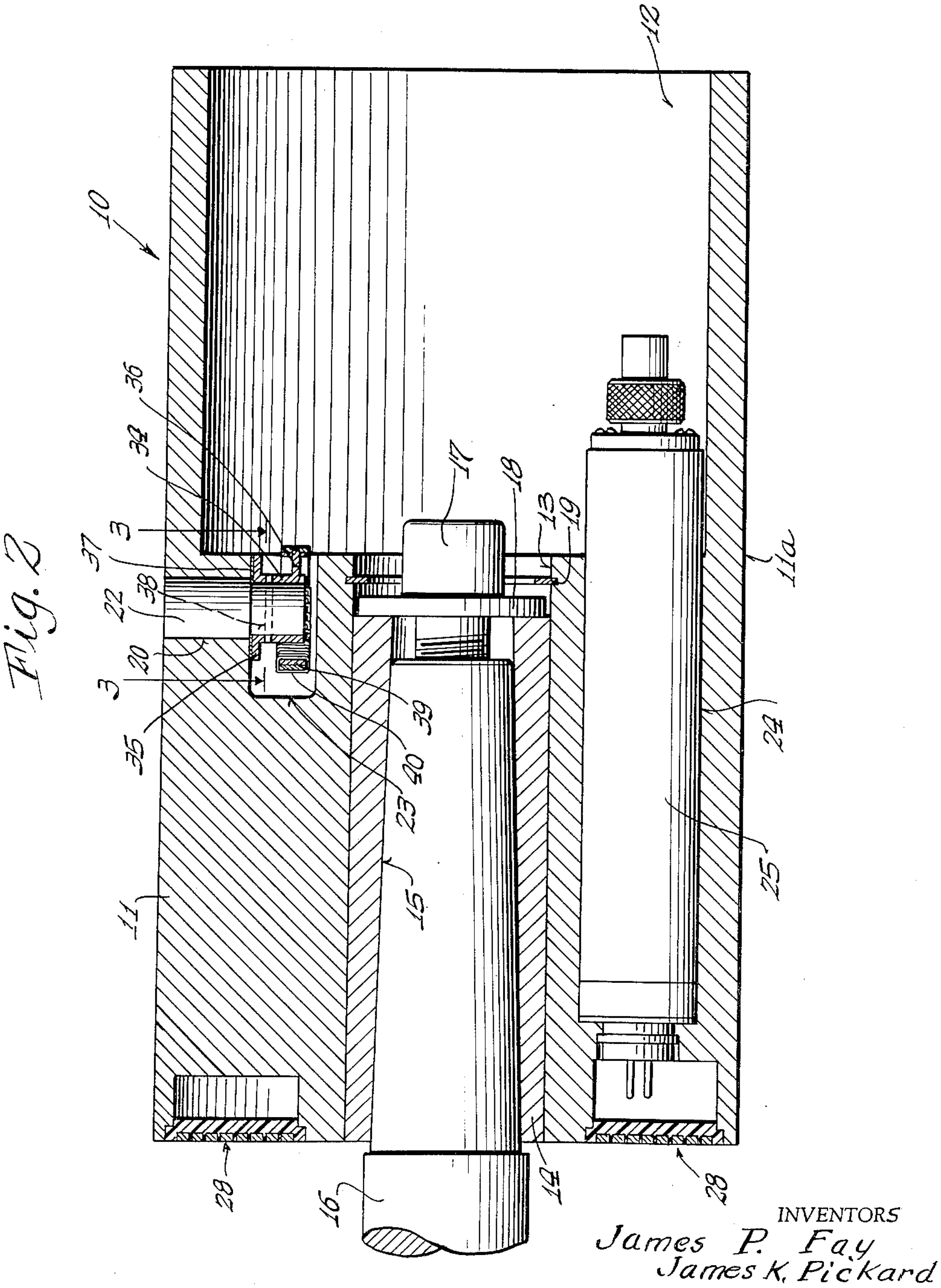
FIG. 2 is a sectional view taken in the direction of the arrows 2—2, in FIG. 1.

The signal reproducing or playback head 22, which is formed with a scanning gap or slot 22*a*, is provided with a collar 34, similar to collar 29 on the recording head, and likewise formed with a flange 35 for preventing axial displacement through bore 20, and an outstanding tongue 36. The collar, which is spaced from the outer wall of chamber 23 by a head spacer 37 for fixing the position of the outer end of the head relative surface 11*a* of the drum, is secured against rotation with respect to head 22 by a pin 38, extending therebetween. The head may be rotated for adjusting the position of the slot 22*a* therein, for correcting for skew and other errors in the recording on the tape, by means of hydraulic or pneumatic actuators, mechanical means, electrical means or, as herein illustrated, by means of a flexible bimetallic element 39, mounting a heater 40, in heat transfer relationship thereto. The element is connected to drum body 11, by screws 41 or similar means, and extends through chamber 23 around collar 34 for operable connection thereto. A slot 42, formed in the bimetallic element, engages tongue 36 on the collar. On applying heat to element 39, as, in the illustrated structure, by passing a current to the heater 40 through leads 43, the element flexes, inwardly or outwardly, thereby rotating head 22 through tongue 36, collar 34 and pin 38. The desired amount of rotation can be effected by controlling the current in the circuit by a remote controlled rheostat or the like, to the required position as determined by the intensity of the signal being picked up by head 22. In FIG. 7 one means is shown for controlling the heater, whereby the amount of rotation of the head can be controlled. As illustrated, the heater 40 is connected to a battery B and a rheostat R, in series with the battery controls the flow of current to the heater, thus controlling the flexing of the bimetallic element.

Figure 6:
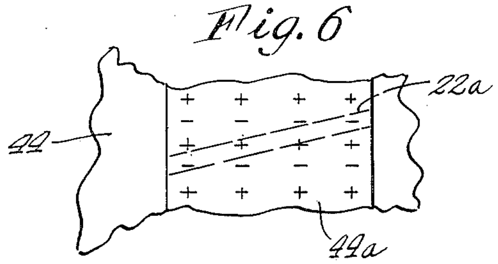
FIG. 6 is a diagrammatic illustration of a portion of a track on a recording tape, with signals impressed thereon, out of predetermined relationship with a playback head.
Figure 4:
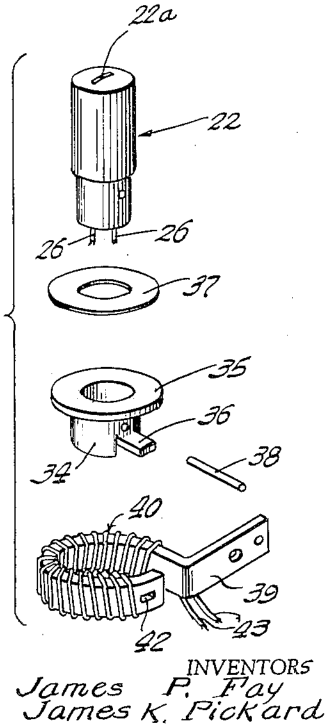
FIG. 4 is an exploded perspective view of the playback head and adjustable mounting means.
Figure 5:
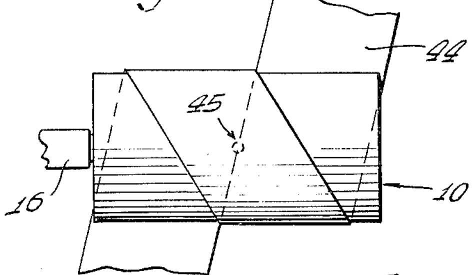
FIG. 5 is a schematic illustration of a recording tape being carried by a rotating drum, in predetermined relationship with a recording or reproducing head.

Referring now to FIGS. 5 and 6, it will be noted that recording tape 44 is carried around drum 10 in a helical turn to overlie the recording or reproducing head, indicated by numeral 45. If the head 45 is a recording head the signals will be impressed on the tape in a helical or a plurality of diagonal paths of predetermined width and in such a manner as to establish a signal relationship therewith as determined by the gap in the head. If head 45 is a reproducing or playback head, the maximum intensity can only be obtained by assuring that the scanning gap in the playback head and the signal on the tape are in substantially the same predetermined relationship, as was established when the signals were recorded.

In FIG. 6 a tape 44, having a path 44*a*, provided with a signal pattern diagrammatically indicated by plus and minus signs, is shown moving across a playback head 22, the scanning gap 22*a* of which is illustrated by broken lines. The tape and the head, as illustrated, are out of alignment and the proper signal intensity is not being achieved. In order to achieve the desired signal it will be necessary to rotate the head so as to locate the gap in substantial parallel relation with the signal, i.e. the plus or minus signs extending across the tape, as formed thereon by the recording head so that at any given instant only plus signals or only minus signals are aligned with the head, at one time, as the tape is carried around the drum. In this manner, the predetermined relationship between the gap on the head and the signal on the tape is established.

In the operation of the instant invention, the playback head 22 is rotated with respect to drum 10, to establish the predetermined relationship with the tape by applying heat to the bimetallic element 39, so that it flexes and turns collar 34, thereby turning the head. The proper positioning of the scanning gap in the head with respect to the signal on the tape, is determined by the intensity from the reproduced signals, in any manner known to the art. By means of the adjustable playback head, recording tapes, which include a signal path having an established predetermined relationship with the gap in a recording head, may be readily utilized on different machines, and carriers, with heads mounted therein, may be freely interchanged.

Thus, among others, the several objects of the invention as aforenoted are achieved. Obviously, numerous changes in the structure may be resorted to without departing from the spirit of the invention as defined by the claims.

We claim:

1. In an apparatus for reproducing signals, particularly high frequency signals recorded in predetermined paths on a tape, means for feeding said tape, means for mounting a playback head having a gap therein for movement over said recorded paths to pick up the recorded signal therefrom; the improvement wherein the means for mounting said head includes means for rotatably supporting said head on said mounting means, motive means connected to said means for rotatably mounting said head for rotating the same, and remotely controlled means connected to the motive means for energizing the same and rotating the head to move the gap about an axis in said head, passing through the gap into parallel relation with respect to said recorded signal.

2. In an apparatus for reproducing signals, particularly high frequency signals magnetically recorded in predetermined paths, on a tape, means for feeding said tape, means for mounting a magnetic playback head having a scanning gap therein for movement over said recorded paths to pick up the recorded signal therefrom; the improvement wherein the means for mounting said head includes means for rotatably supporting said head on said mounting means, motive means connected to said means for rotatably mounting said head for rotating the same, and remotely controlled means connected to the motive means for energizing the same and rotating said head about an axis thereof passing through said gap with respect to said recorded signal to locate the gap in parallel relation with said signal, whereby said gap spans, at a given instant, substantially a single set of magnetic values in the signal, as recorded on the tape by the recording head so that mounting errors and skew errors can be corrected.

3. In an apparatus for reproducing signals, particularly high frequency signals magnetically recorded in predetermined paths on a tape, means for feeding said tape, means for mounting a magnetic playback head having a scanning gap therein for movement over said recorded paths to pick up the recorded signal therefrom; the improvement wherein the means for mounting said head includes means for rotatably supporting said head on said mounting means for rotation therewith, motive means connected to said means for rotatably mounting said head for rotating the same, and remotely controlled means connected to the motive means for energizing the same and rotating said head about a longitudinal axis passing through said gap with respect to said recorded signal, so that a predetermined relationship is established between the playback head and the signal, as recorded on the tape by the recording head, whereby mounting errors and skew errors can be corrected.

4. In an apparatus for reproducing signals, particularly high frequency signals magnetically recorded in predetermined paths on a tape, means for feeding said tape, means for mounting a magnetic playback head having a scanning gap therein for movement over said recorded paths to pick up the recorded signal therefrom; the improvement wherein the means for mounting said head includes a collar connected to said head for rotatably supporting the same with respect to said mounting means, motive means connected to said collar for rotating the same, and remotely controlled means connected to said motive means for energizing the same and rotating said head about an axis passing through said gap with respect to the recorded signal to locate the gap in parallel relation with said signal, whereby said gap spans at a given instant substantially a signal set of magnetic values in the signal as recorded on the tape.

5. In an apparatus for reproducing signals, particularly high frequency signals magnetically recorded in predetermined paths on a tape, means for feeding said tape, means for mounting a magnetic playback head having a scanning gap therein for movement over said recorded paths to pick up the recorded signal therefrom; the improvement wherein the means for mounting said head includes a collar connected to said head for movement therewith, said collar mounting said head for rotation with respect to said mounting means, a drive element adapted to be energized connected to said mounting means and operably connected to said collar, and remotely controlled means operably associated with said element for energizing the same, whereby said head is rotated about an axis passing through said gap relative to said mounting means so that the scanning gap in the playback head is in parallel relation with respect to the signal recorded on the tape.

6. In an apparatus for reproducing signals, particularly high frequency signals magnetically recorded in predetermined paths on a tape, means for feeding said tape, means for mounting a magnetic playback head having a scanning gap therein for movement over said recorded paths to pick up the recorded signal therefrom; the improvement wherein the means for mounting said head includes a collar connected to said head for movement therewith, said collar mounting said head for rotation with respect to said mounting means, a flexible bimetallic element connected to said mounting means and operably connected to said collar, a heater in heat transfer relationship with said element, and means controlling said heater for flexing the bimetallic element, whereby said head is rotated relative to said mounting means so that the scanning gap in the playback head is in parallel relation with respect to the signal recorded on the tape.

7. In an apparatus for reproducing signals, particularly high frequency signals magnetically recorded in predetermined paths on a tape, means for feeding said tape, means for mounting a magnetic playback head having a scanning gap therein for movement over said recorded paths to pick up the recorded signal therefrom; the improvement wherein the means for mounting said head includes a collar formed with an outstanding tongue connected to said head for movement therewith, said collar mounting said head for rotation with respect to said mounting means, a flexible bimetallic element connected to said mounting means and engaging said tongue, an electric heater in heat transfer relationship with said element, and means for controlling the current in said heater for flexing the bimetallic member whereby said head is rotated relative said mounting means so that said scanning gap in the playback head is in parallel relation with respect to the signal recorded on the tape.

8. Means for adjustably mounting a playback head having a scanning gap at one end thereof into predetermined relationship with a high frequency signal path on a tape comprising means for rotatably supporting said head on a mounting means for rotation about a longitudinal axis passing through said gap, motive means connected to said means for rotatably mounting said head for rotating the same, and remotely controlled means connected to the motive means for energizing the same and rotating the head, whereby the gap in said head can be adjusted so that the gap in the playback head is substantially parallel to the recorded signal on the tape.

9. Means for adjustably mounting a playback head having a scanning gap at one end thereof into predetermined relationship with a high frequency path on a tape comprising a collar connected to said head for rotatably supporting the same on a mounting means for rotation about a longitudinal axis passing through said gap, motive means connected to said collar for rotating the same, and remotely controlled drive means connected to said motive means for energizing the same and rotating said head with respect to said mounting means, whereby the gap in said head can be adjusted so that a predetermined parallel relationship is established between the gap in the playback head and the recorded signal on the tape.

10. Means for adjustably mounting a playback head having a scanning gap at one end thereof into predetermined relationship with a high frequency path on a tape comprising a collar connected to said head and rotatably supporting the same on a mounting means for rotation about a longitudinal axis passing through said gap, a flexible bimetallic element connected to the mounting means and collar, an electric heater operably associated with said element for flexing the same, and means controlling said heater, whereby said head is rotated with respect to said mounting means so that the gap in said head can be adjusted to a predetermined established relationship with the recorded signal on the tape.

References Cited in the file of this patent

UNITED STATES PATENTS

| | | |
|---|---|---|
| 2,530,584 | Pontius | Nov. 21, 1950 |
| 2,574,898 | Von Behren | Nov. 13, 1951 |
| 2,587,097 | Berlant | Feb. 26, 1952 |
| 2,751,439 | Burton | June 19, 1956 |
| 2,787,750 | Jones | Apr. 2, 1957 |
| 2,856,462 | Lyon | Oct. 14, 1958 |
| 2,860,191 | Runge et al. | Nov. 11, 1958 |
| 2,900,625 | Jones | Aug. 18, 1959 |

UNITED STATES PATENT OFFICE

CERTIFICATE OF CORRECTION

Patent No. 3,029,318

April 10, 196;

James P. Fay et al.

It is hereby certified that error appears in the above numbered patent requiring correction and that the said Letters Patent should read as corrected below.

Column 2, line 66, after "in" insert -- a --; column 4, line 19, after "head" strike out the comma; line 74, for "sign read -- single --.

Signed and sealed this 24th day of July 1962.

(SEAL)
Attest:

ERNEST W. SWIDER
Attesting Officer

DAVID L. LADD
Commissioner of Patents